Oct. 7, 1969     B. A. BYDAL     3,470,912

FLOW INVERTER

Filed Nov. 30, 1966

United States Patent Office 3,470,912
Patented Oct. 7, 1969

3,470,912
FLOW INVERTER
Bruce Alfred Bydal, Martinsville, Va., assignor to E. I.
du Pont de Nemours and Company, Wilmington, Del.,
a corporation of Delaware
Filed Nov. 30, 1966, Ser. No. 598,076
Int. Cl. F15d 1/02
U.S. Cl. 138—37                                    4 Claims

ABSTRACT OF THE DISCLOSURE

A flow inverter in the form of a cylindrical insert in a transfer pipe for viscous fluids. The insert has longitudinal surface grooves which extend partially through its length from opposite ends. Each groove communicates with a blind bore in the opposite end of the insert.

---

This invention relates to the flow of fluids in conduits and, more particularly, to an improved flow inverter for equalizing the flow rate of a viscous material.

Viscous fluids flow through a pipeline with something approaching a parabolic distribution of velocities across the cross section in that fluid close to the wall of the pipe is moving at a relatively low velocity in comparison with fluid in the center. In many processing systems, such a velocity distribution is extremely undesirable because of the longer residence time for material flowing near the surface of the pipe. For example, in polymerization processes where molten polymer is transferred from one point to another by means of pipelines, a relatively long residence time for the peripheral material can cause it to polymerize to a much higher molecular weight than faster moving material in the center of the pipe. The resulting polymer consequently has an undesirably wide molecular weight distribution. In the case of some polymers such as polyamides, longer residence of the peripheral material in the pipelines also leads to increased formation of gel particles which lower the quality of the fiber or other article formed from the polymer.

Although flow inverters of the type disclosed by Boucher et al. in U.S. Patent 3,128,794 can be used to reduce unequal velocity distributions and have proved very successful in this regard, they are not only difficult to fabricate, especially in small sizes, but also clog easily with gel particles and other foreign materials.

The various improvements and advantages disclosed herein have been achieved with a cylindrical insert adapted to fit within a transfer pipe for viscous materials and provided with a plurality of longitudinal surface grooves extending partially through its length. Extending inwardly from each end of the insert, there is an axial bore. Each partial groove opens into one end of the insert and communicates with the axial bore which extends inwardly from its opposite end. The grooves are staggered longitudinally with alternate grooves opening into opposite ends of the insert.

Figure 1:
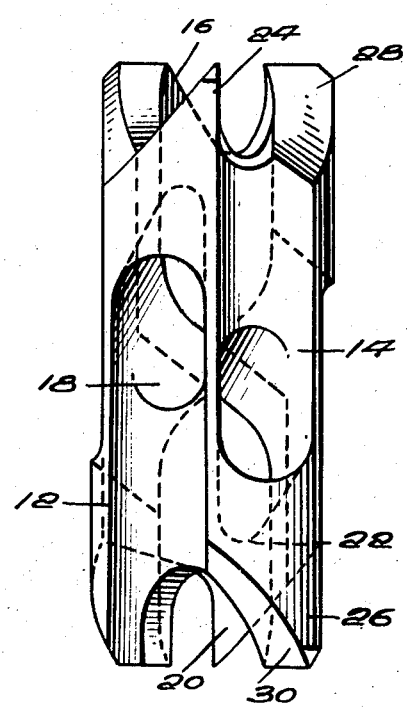
Figure 4:
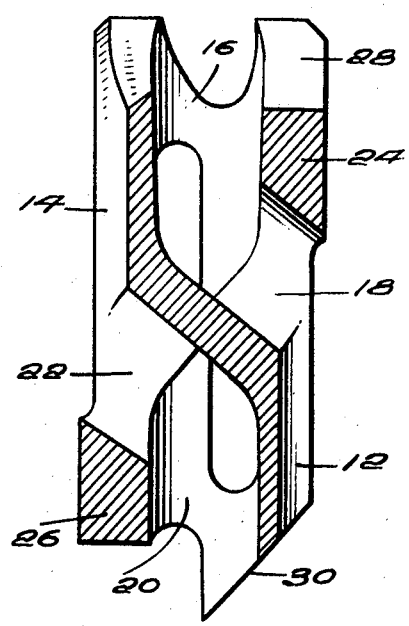
Figure 2:
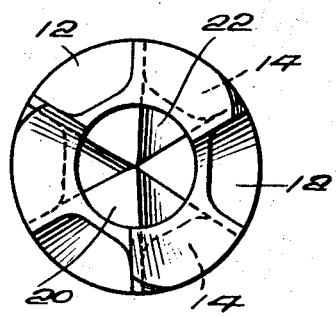
Figure 3:
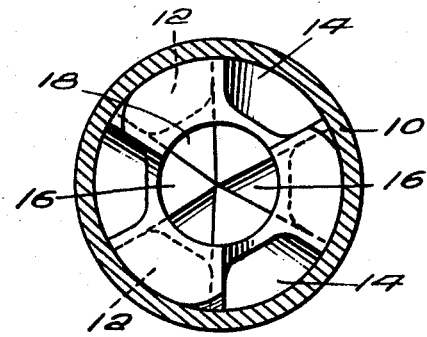

In the drawing, FIGURE 1 is a side view, FIGS. 2, 3 are opposite end views, and FIG. 4 is a longitudinal section through the flow inverter described hereinafter.

The embodiment chosen for purposes of illustration is adapted to fit tightly in a pipe length shown only at 10 in FIG. 3. As such, the flow inverter is a generally cylindrical insert provided with a first set of three longitudinal surface grooves 12 and a second set of oppositely disposed grooves 14. Grooves 12, 14 extend only partially through the length of the insert, with grooves 12 opening into one end (FIG. 2) and grooves 14 opening into the opposite end (FIG. 3), i.e., grooves 12, 14 are staggered longitudinally, with alternate grooves opening into opposite ends of the insert. Discontinuous grooves 12 communicate with an axial bore 16 through axially oriented, convergent passages 18 whereas all grooves 14 communicate with an axial bore 20 at the other end of the insert through passages 22. As best illustrated in FIGS. 2, 3, bores 16, 20 terminate in conical configurations interrupted by tear-shaped openings to passages 18, 22.

Where grooves 12, 14 terminate, the cylindrical surface of the insert continues in the form of lands 24, 26 having end walls 28, 30 disposed angularly toward and presenting a relatively wide mouth to the adjacent surface groove. As illustrated, each land has an axially disposed end wall on its other side, opposite the angularly disposed end wall of an adjacent land. On inspection, it can be seen that either set of surface grooves and the axial bore with which they communicate consume about half the cross-sectional area of the insert.

When the insert has been fitted in pipe 10 and a high viscosity fluid such as a molten polyamide is passed through the pipe, fluid near the walls of the pipe passes through grooves 12 and passages 18 into the axial bore 16 while molten polymer in the center of the pipe passes through axial bore 20 and passages 22 into grooves 14. Thus, there are three grooves extending from either end of the inverter and correspondingly three passages leading to a single axial bore from each set of grooves. By this means, the peripheral fluid near the pipe wall is reoriented radially to the center of the pipe after the central fluid is transferred to the outside.

End walls 30 of lands 26 direct the peripheral fluid into grooves 12. These deflectors are angularly disposed and contoured to avoid dead zones which promote polymer degradation. In the embodiment illustrated, the end walls 30 are angled so that a considerable part of the peripheral fluid entering grooves 12 is reoriented circumferentially to give somewhat better mixing of the fluid. Similarly, fluid entering bore 20 and exiting through grooves 14 follows end walls 28 which are disposed angularly in the opposite direction from end walls 30. Such rotational translations are especially advantageous with two-phase polymer systems.

Although the number of surface grooves may be varied somewhat depending on the size and intended use of the flow inverter, the optimum number appears to be six, i.e., three at either end. While the lengths of the grooves may be varied somewhat, they extend more than half way through the length of the insert for the dual purposes of inverting the fluid in sequence and providing a maximum free area for flow.

The flow inverters of this invention may be fitted into a pipeline by welding or by shrinking the pipe onto the inverter. However, the preferred method is to counterbore a portion of the pipe to a slightly larger diameter and fit the inverter snugly into the larger bore with the downstream end of the inverter abutting the smaller bore section. In some installations, it is desirable to provide a flanged spool piece into which the inverter is slip fit as described above, the spool piece then being inserted into the pipeline having corresponding flanges and bolted in place by means of the flanges. This facilitates placement and removal of the inverter. Where the pipeline is jacketed and heated by high temperature vapors such as "Dowtherm," as is commonly done in the handling of molten synthetic polymers, the spool piece may be suitably jacketed and provided with vapor passages matching those of the pipeline.

With the above type of flow inverter the free area for polymer flow may amount to as much as 50–55% of the original unobstructed flow area as compared to 25% or less of the area available with the flow inverter of Boucher et al. Thus, a two-fold increase in free area for polymer flow is achieved. With such an increase in free area, the insert is less susceptible to clogging. Furthermore, the flow inverter of this invention is easily machined and does not require hand work to provide for smooth flow of the polymer and eliminate dead spots which result in polymer stagnation.

Where rotational translations of the fluid are either unnecessary or undesirable, lands 24, 26 should be V-shaped. Other changes and modifications of a similar nature will occur to those skilled in the art without departing from the invention which accordingly is intended to be limited only by the scope of the appended claims.

Having thus described the invention, what is claimed as new and desired to be secured by Letters Patent is:

1. An elongated insert having a cylindrical surface adapted to fit within a transfer pipe for viscous materials, said surface being provided with a plurality of longitudinal grooves extending partially through its length and having an axial bore extending inwardly from each of its ends, each groove being open at one end of the insert and in communication with the axial bore extending inwardly from the opposite end, said grooves being staggered longitudinally with alternate grooves being open at opposite ends of the insert.

2. The insert of claim 1 wherein the cylindrical surface extends beyond each groove in a land, each land having axially and angularly disposed end walls merging with the open ends of adjacent grooves.

3. The insert of claim 1 wherein is provided an axially oriented, convergent passage connecting each groove with an axial bore.

4. The insert of claim 1 wherein the cross-sectional areas of grooves opening into one end and a bore approximately equal the remaining cross-sectional area.

References Cited

UNITED STATES PATENTS

| 2,491,872 | 12/1949 | Neuman | 138—37 X |
| 3,051,452 | 8/1962 | Nobel | 138—42 X |
| 3,328,003 | 6/1967 | Chisholm | 138—42 X |

FOREIGN PATENTS

| 891,212 | 3/1962 | Great Britain. |
| 808,766 | 7/1951 | Germany. |

HERBERT F. ROSS, Primary Examiner

U.S. Cl. X.R.

137—1; 259—4